United States Patent [19]

Engel et al.

[11] Patent Number: 4,699,522

[45] Date of Patent: Oct. 13, 1987

[54] ROLLING ELEMENT CAGE FOR AN AXIAL BEARING

[75] Inventors: Hans-Joachim Engel, Trimbach; Jaroslav Vopat, Wallisellen, both of Switzerland

[73] Assignee: SRO Kugellagerwerke J. Schmid-Roost AG, Switzerland

[21] Appl. No.: 937,370

[22] Filed: Dec. 3, 1986

[30] Foreign Application Priority Data

Dec. 3, 1985 [EP] European Pat. Off. ........ 85115329.6

[51] Int. Cl.$^4$ ............................................. F16C 29/04
[52] U.S. Cl. ......................................... 384/51; 384/47
[58] Field of Search ....................... 384/47, 51, 49, 54, 384/55, 525

[56] References Cited

U.S. PATENT DOCUMENTS

| | | | |
|---|---|---|---|
| 3,001,835 | 9/1961 | Kramer | 384/47 |
| 3,239,282 | 3/1966 | Schroll et al. | 384/49 |
| 3,778,121 | 12/1973 | Levesque | 384/47 |
| 4,598,957 | 7/1986 | Shibayama | 384/51 |

FOREIGN PATENT DOCUMENTS 2051777 4/1972 Fed. Rep. of Germany .

Primary Examiner—Lenard A. Footland
Attorney, Agent, or Firm—Ostrolenk, Faber, Gerb & Soffen

[57] ABSTRACT

A telescopic shaft useful, for example, on an automobile steering assembly includes an external sleeve and an internal bolt within the sleeve and axially extending rows of rolling elements in respective axially extending raceways for defining the axial bearing between the bolt and the sleeve. The disclosure concerns a cage for the bearing which is comprised of resilient wire and includes a pair of yokes at the axially opposite ends of the rows of rollers, and the yokes are held together by lengths of wire at their circumferential ends. The yokes are of a circumferential length so as to cover the axial ends of the rows of rollers, whereby the yokes generally extend over more than 180°. One cage yoke includes radially directed extensions which extend into a borehole in the bolt or the sleeve. The one yoke is interrupted intermediate its arcuate length and the extensions are defined at the interruption.

16 Claims, 5 Drawing Figures

ROLLING ELEMENT CAGE FOR AN AXIAL BEARING

BACKGROUND OF THE INVENTION

The present invention refers to an axial bearing and particularly to a rolling-element cage for such a bearing.

In certain automobiles it is necessary to provide an intermediate shaft between the steering axle and the steering gear. Initially, a rigid bolt was installed, which was provided with connecting yokes on both sides. This, however, made the mounting of the intermediate shaft difficult since the connecting parts had to have the precise axial spacing of the intermediate shaft. Furthermore, axial adjustment was not possible, for instance, in the event of different thermal expansions. Upon occurrence of an accident, furthermore, the axial rigidity is a disadvantage.

It is now possible to develop such a unipartite shaft so that it is axially variable through developing the single shaft in two parts, namely a bolt which is slidingly guided in a sleeve. Instead of a sliding bearing between these parts, an anti-friction bearing can also be provided. In that case, a plurality of rolling elements lie in at least two axially extending races which are provided at circumferentially opposite or symmetric locations with respect to each other around the bolt and the sleeve. To prevent the rolling elements from axially moving out of their races, a cage may be provided. Such a cage has generally comprised a cylindrical body with recesses for the rolling elements. Such cage embodiments are, however, difficult and expensive. Furthermore, this cage, together with its rolling elements, might move impermissibly out of the central position along the shaft. Ordinarily, return springs are therefore provided in the region of the ends of the cage. But, these springs require a further additional expense.

Examples of prior art cages for axial bearings can be found in German application No. DE-OS 2,051,777 and in U.S. Pat. No. 3,239,282.

SUMMARY OF THE INVENTION

The object of the present invention is to provide a cage for an axial bearing which does not have the disadvantages indicated above and which can be easily manufactured, permits a certain axial mobility of the rolling elements and returns the rolling elements into the central position.

An axial bearing on a telescopic shaft comprises at least a pair of axially extending rows of rolling elements between the external sleeve and the internal bolt at diametrically opposite locations around the shaft. Appropriate rolling elements are supported in axially extending grooves which define the rolling element raceways. The grooves for the rolling elements are defined in at least one or in both of the bolt and the sleeve, and where they are defined in both, the axially extending grooves are located at the same circumferential location around the bolt so that a cooperating groove pair in the bolt and the sleeve hold the rolling elements. In the preferred embodiment, the grooves of the pair of grooves in the sleeve and in the bolt are V-shaped, and the apex of the groove is at right angles, making a space enclosed by a cooperating groove pair square in cross-section. The rolling elements are cylindrical rollers and are preferably arrayed with the alternate rolling elements having their axes offset 90°.

The improved cage of the invention for such an axial bearing is comprised of a plurality of resilient wire sections which are preferably formed from a single piece of wire. Axially outward of each axial end of the axial rows of rolling elements there is disposed a generally arcuately curved wire yoke which extends over a sufficiently large arc as to block the ends of all of the rows of the rolling elements, and therefore extends over more than 180°. At least one of the yokes is resilient wire, although preferably both are. The yokes are connected by axially extending wire sections. There are at least two such sections, each extending axially between the circumferential ends of the two axially spaced apart yokes. In this way, the rows of rolling elements are blocked from falling free axially.

To prevent axial movement of the rolling elements out of the central position, and for keeping the rolling elements at their desired axial location along the telescopic shaft, the cage, and particularly at least one of the yokes, includes means thereon for securing the yoke to one or both of the bolt and the sleeve. In particular, the secured yoke includes radially extending projections which extend into the bolt and/or the sleeve, and in the preferred embodiment into the bolt, for holding the cage in a desired axial position which correspondingly holds the retained rolling elements at a desired axial position along the bolt. Despite this mode of attachment of the wire cage, axial movement of the rolling elements is still permitted, as a result of the great resilience of the wire cage. Since a certain restoring force is built up, the rolling elements are also after some time returned into their desired central position.

The cage is particularly resilient and simple if, in accordance with a preferred embodiment, it is provided at the place of interruption of the cage wire on one of the yokes with a radially-directed extension which extends into a borehole in either the bolt or the sleeve. In this case, as an alternative, the resilience of only one yoke might be utilized. This construction is simplest and most reliable if two radially-directed extensions are provided on the yoke having the place of interruption, with both of the extensions engaging into the same borehole in the bolt or sleeve.

BRIEF DESCRIPTION OF THE DRAWINGS

The invention will be explained in further detail with reference to the drawings, in which.

DESCRIPTION OF THE PREFERRED EMBODIMENT

Figure 1:
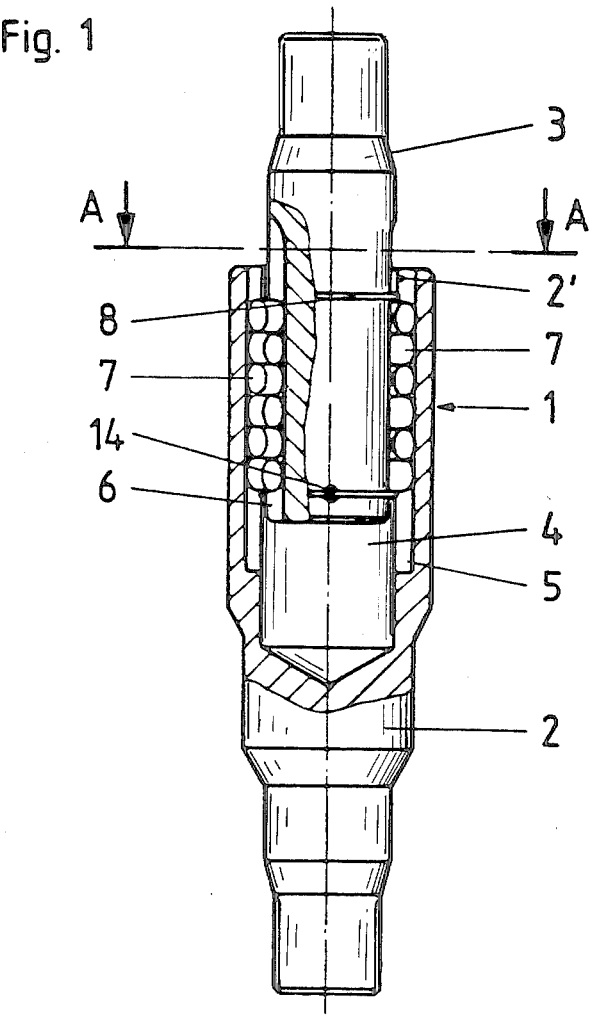
FIG. 1 shows a telescopic shaft in partial longitudinal section with the cage of the invention in place.
Figure 2:
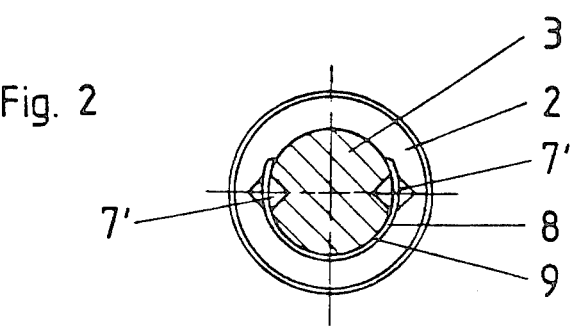
FIG. 2 is a cross sectional view along line A—A of FIG. 1.

The telescopic shaft, as shown in FIGS. 1 and 2, includes a middle piece 1 having connecting yokes (not shown) on both ends. This middle piece 1 is in two parts, comprising the radially outward external sleeve 2 having an end opening 2' in which the radially inward bolt 3 is axially displaceable within a guide section 4 of the opening 2'. Both the sleeve 2 and the bolt 3 have two axially extending V-shaped grooves 5 and 6, respectively formed on the interior of the sleeve and the exterior of the bolt. Each pair of grooves 5 and 6 are arranged approximately diametrically opposite each other. The apex of each groove is about 90° so that the groove pair encloses a square cross section space.

In each groove pair are disposed an array of generally cylindrical rollers 7. As can be seen in FIG. 1, the axes of rotation of adjacent rollers 7 in a row are perpendicular to each other while the ends of the rollers are at the walls of the grooves. By the selection of rollers 7 of a given size, support of the two parts 2 and 3 which is free of play can be obtained by simple means.

Figure 4:
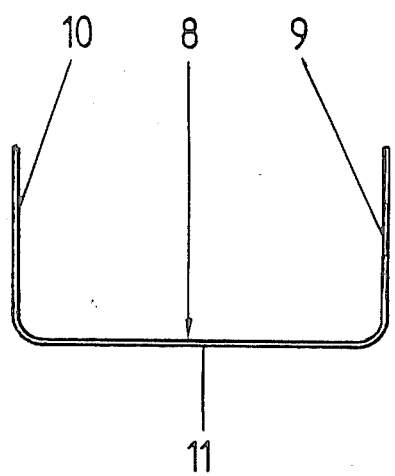
FIG. 4 is a radial view of the wire cage of FIG. 3.
Figure 3:
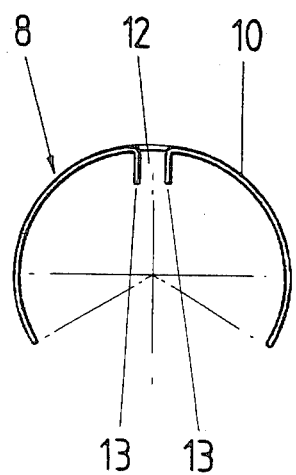
FIG. 3 is an axial end view of the wire cage of the invention.
Figure 5:
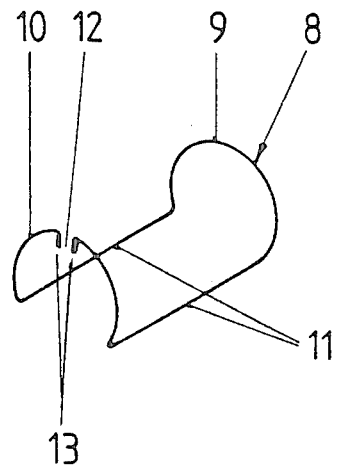
FIG. 5 is a perspective view of the wire cage of FIGS. 3 and 4.

To hold the rollers 7 in the axially central position along the shaft, a cage 8 made of a single length of bent resilient wire is provided. The shape of this cage 8 can be better noted from FIGS. 3, 4 and 5. The cage includes two axially opposite arcuately curved yokes 9 and 10, which are connected at the circumferential ends of the yokes by axially extending sections 11. Each yoke wraps about the bolt 3 over an arc of about 250° and blocks both rows of rollers 7' at their ends and thus prevents the axial migration of individual rollers 7.

One yoke 9 is a closed loop. The other yoke 10 has an interruption 12 intermediate its ends. At this place of interruption 12, there are two radially inwardly directed extensions 13. As shown in FIG. 1, both extensions extend radially inwardly into a borehole 14 in the bolt 3. This provides a dependable axially resilient connection of the cage 8 to the bolt 3. Because the cage 3 is formed of wire and is also resilient in shape, the rows of rollers 7' can move axially, but are constantly pressed back into the desired central position as a result of the attachment of the cage 8 on the bolt 3.

Although the present invention has been described in connection with a preferred embodiment thereof, many variations will now become apparent to those skilled in the art. It is preferred, therefore, that the present invention be limited not by the specific disclosure herein, but only by the appended claims.

What is claimed is:

1. A rolling element cage for an axial bearing, wherein the bearing comprises a radially outward sleeve and a radially inward bolt within the sleeve and comprises axially extending rolling element races between the bolt and the sleeve and a plurality of rolling elements in the races,
   the cage comprising a respective yoke for being placed axially outward of the axially outermost rolling elements of all of the rolling element arrays, and there being a respective yoke at each axial end of the plurality of rolling elements, an axially extending section between the yokes of the cage for holding and spacing the yokes apart, the yokes being of an arcuate length such that each yoke extends past all of the axial rolling element races, and
   means on the cage for fastening the cage at a selected axial position along at least one of the bolt and the sleeve, whereby the cage might hold the rolling elements at a predetermined axial position along the shaft.

2. The cage of claim 1, wherein the cage is comprised of resilient wire.

3. The cage of claim 2, wherein the entire cage is comprised of a single piece of wire shaped to define the cage.

4. The cage of claim 2, further comprising one of the yokes including thereon the means for fastening the yoke to one of the bolt and the sleeve.

5. The cage of claim 4, wherein the means for fastening comprises the one yoke including radially directed means for engaging the respective one of the bolt and the sleeve for holding the cage to it.

6. The cage of claim 4, wherein the means for fastening comprises the one yoke including a radially inwardly directed projection for engaging the bolt, for fastening the axial position of the cage along the bolt.

7. The cage of claim 4, wherein the one yoke is broken along its length defining an interruption, and at the interruption, the means for fastening comprises the one yoke being bent radially inwardly for defining projections which extend to the bolt for fastening the cage to the bolt.

8. The cage of claim 1, wherein there are two of the axially extending sections between the yokes, with each of those sections extending between the respective circumferential ends of the arcuate yokes.

9. In combination, the cage of claim 1 and an axial bearing comprising the sleeve and the bolt, at least two of the axially extending races for rolling elements defined between the bolt and the sleeve and a plurality of the rolling elements supported in each of the races;
   the yokes of the cage being disposed on axially opposite sides and outward of each of the rows of rolling elements in their respective races for thereby holding the rolling elements between the yokes of the cage;
   the means for fastening the cage to one of the bolt and the sleeve.

10. The combination of claim 9, wherein each of the races comprises a respective pair of grooves defined in the bolt and in the sleeve and each groove of the pair of grooves being defined radially opposite one another for defining one raceway for a plurality of the rolling elements.

11. The cage of claim 9, wherein the means for fastening comprises one yoke having a radially directed projection which engages one of the bolt and the sleeve for securing the cage to the respective one of the bolt and the sleeve to which the projection extends.

12. The combination of claim 11, wherein the projection from the one yoke is radially inwardly directed toward the bolt and the bolt includes an opening therein for receiving the projection.

13. The combination of claim 12, wherein the one yoke of the cage includes an interruption along its arcuate length at which the yoke is broken, the one yoke being bent radially inwardly for defining two radially inwardly directed extensions;
   a respective borehole being defined in the bolt, and the radial extensions from the one yoke extending into the borehole.

14. The combination of claim 9, wherein the cage is comprised of resilient material.

15. The combination of claim 9, wherein the cage is comprised of wire.

16. The combination of claim 9, wherein there are two of the axially extending sections between the yokes, with each of those sections extending between the respective circumferential ends of the arcuate yokes.

* * * * *